United States Patent [19]

Sloyan, deceased et al.

[11] 4,252,380
[45] Feb. 24, 1981

[54] BEARING ARRANGEMENT FOR MOTOR SUPPORT

[75] Inventors: Jerome J. Sloyan, deceased, late of Hamilton Square, N.J.; Joseph File, co-executor; Seth A. Hubbard, co-executor, both of 10 Millbrook La., Lawrenceville, N.J. 08648

[73] Assignees: Joseph File; Seth A. Hubbard, both of Lawrenceville, N.J.

[21] Appl. No.: 12,803

[22] Filed: Feb. 16, 1979

[51] Int. Cl.³ .............................................. F16C 29/02
[52] U.S. Cl. .......................... 308/3 R; 74/242.13 A; 248/657; 474/26; 474/115
[58] Field of Search ............... 74/242.13 A; 248/657; 308/3 R, 3 A, 5 R, 237 A, 238, DIG. 8

[56] References Cited

U.S. PATENT DOCUMENTS

| 2,833,597 | 5/1958 | Sloyan | 308/3 R X |
| 3,586,273 | 6/1971 | Sloyan | 308/3 R X |

Primary Examiner—Frederick R. Schmidt
Attorney, Agent, or Firm—Edward F. Connors

[57] ABSTRACT

A motor support has a carriage movably mounted by means of gliders, which are cross-sectionally square elongated tubes, that slidably encompass parallel elongated fixed rails on a stationary base bed with plastic or metal bearing sleeves press fitted in the end portions of the glider tubes to bearingly support them on the rails and transfer the motor load on the glider tubes to the rails in a friction free manner with a reservoir of a viscous lubricant within the center portions of the glider tubes.

3 Claims, 3 Drawing Figures

BEARING ARRANGEMENT FOR MOTOR SUPPORT

BACKGROUND OF THE INVENTION (1) Field Of The Invention

This invention generally relates to novel improvements in movable supports for machinery or mechanisms of diverse character and especially relates to new and novel improvements in supports for motors and machines which are adapted to be powered by motors.

(2) Description Of The Prior Art

Supports of the general type indicated above are well known in the art and, having regard particularly to supports for motors or articles of machinery, prior art examples will be given in the following.

Before referring to specific prior art patents, it is well to understand that the present invention has particular significance and importance in the environment of supporting motors for driving machinery through belts and pulleys and for supporting the machinery that is driven through belts and pulleys by motors.

In an exemplary but not restrictive environment, a motor is equipped with a spring-loaded variable pitch drive pulley and an adjoining powered piece of machinery is equipped with a driven pulley of a fixed diameter. Changes in the speed of the driven pulley are effected by changes in the center distances between the pulleys. Thus, an increase in the center distance will result in a decrease in the speed of the driven pulley and, on the other hand, a decrease in the center distance will result in an increase in the speed.

In order to effect such changes, the motor is mounted on a movable carriage supported on a fixed base which has a plurality, at least a pair, of parallel cylindrical solid rods that define parallel rails. The carriage is slidable on the rails so that it can move rapidly to achieve the changes in speed. If the motor carriage is to be moved manually on the rails, as is usually the case, it can be appreciated that it is essential that such movement be accomplished with a minimum amount of physical exertion.

Various expedients have been employed in attempts to properly support the carriage so that the carriage and the motor load thereon are evenly transferred to the rails and yet to support the carriage in a way to reduce friction resistance to the sliding of the carriage on the rails.

In one of the earliest attempts, as disclosed in Sloyan U.S. Pat. No. 2,762,663 issued Sept. 11, 1956, the fixed portion of the motor support has parallel rails which are made fast to transverse end cleats and the motor carriage has channel-shaped gliders that encompass portions of the rails and provide a race between the corners thereof and the curved surfaces of the rail with a series of balls being disposed within such defined races. It has been found that the ball bearings, which establish line contacts, are not efficient for many reasons including the fact that grooves are developed in the rails which cause the sliding action to lose efficiency and which also cause the carriage to have a tendency to chatter.

In a subsequent Sloyan U.S. Pat. No. 2,833,597, issued May 6, 1958, the gliders are composed of rectangular tubings which are square in cross section and have an inside dimension materially greater than the outside dimension of the cylindrical rails. C shaped bearing assemblies are provided between the gliders and the rails. Such assembly consists of a metallic bushing which has a freely slidable, non-chattering fit on the rails, a C shaped metallic member, equal in length to the bushing, the external circumference of which makes line contact with three adjacent internal surfaces of the square tube glider, a member of resilient material equal in length to and having a push fit over the bushing and having an external diameter slightly greater than the nominal internal diameter of the C shaped member, so that as the assembly of bushing, resilient member and C shaped member are forced into the glider, that portion of the resilient member not enveloped by the C shaped member but which contacts the internal surface of the remaining wall of the glider becomes slightly distorted due to being somewhat compressed between the bushing and the glider. The result is that the bushing becomes slightly non-concentric with the glider. However, the advantage of the resiliency overshadows the lack of concentricity. The resiliency does much to reduce noise likely to develop between the two metallic parts, the bushing and the rail. A typical example is that any noise developed at the source of an air conditioning system is likely to be telegraphed to every room in a building.

In a subsequent Sloyan U.S. Pat. No. 3,017,226, issued Jan. 16, 1962, the cylindrical rails are formed with a predetermined diameter that is uniform throughout their lengths and the gliders are in the form of square tubes having the inside transverse dimensions thereof substantially the same as the diameters of the rails. Midway of the width of each of the four walls of each glider tube tangential line contact is made at each 90 degree interval on the cylindrical rails. This arrangement is very difficult to fabricate and assemble, considering that it is desired that the tubes for the gliders and that the rails both be ordinary commerical products of a shelf item nature. The manufacture of such arrangement, considering the close tolerances, is extremely difficult and the prevention of friction and chattering cannot be achieved to the desired degree.

Sloyan U.S. Pat. No. 3,586,273, issued June 22, 1971, was intended to avoid this problem. In such patent, bushings, which are externally square are bored to slide freely over cylindrical rodlike rails, then enclosed in square tubular glides in a tight non-rotatable fashion. The rodlike rails extend longitudinally and are fixed at their ends in cleats. The square bushings conform to the internal dimensions of the gliders into the ends of which they are applied as shrunk fits. Each bushing is then reamed to establish a through and through longitudinal bore with sufficient clearance to receive the rails in a freely slidable non-chattering fit throughout the lengths of the bushings. The void existing in the gliders between the bushings provides a reservoir for a lubricant.

SUMMARY OF THE INVENTION

In accordance with the present invention each rail is constituted by a commercially available, shelf item in the form of a cylindrical solid rod of a given diameter. Each glider is composed of a tube, which is square in cross section. It is almost essential that the glider be a square tube, for a round tube which would complement the cylindrical rail is impractical because welding the motor seating cross members of the carriage to a round tube would result in the distortion of both members. It can be appreciated that the square tube would have a flat upper surface on which motor supporting members of the carriage can be fixedly superimposed by welding, whereas such members would rest in point contact on a round tube and the arcuate portion of such tube on which it would rest could not properly support it and it would be difficult to try to weld the two together.

Considering that the stresses in the carriage are imposed on the ends of the rails, it is at the end portions of the rails and the glider tubes that bearing supports should be provided.

It has been found that, as an improvement over the discussed and all other known prior bearing arrangements, the bearing assembly of the present invention provides sleeves of plastic or metal that are fitted into the end portions of the gliders and press fitted therein so that such bearing sleeves fit tightly within the end portions of the gliders. In the instance of plastic bearing insert sleeves, it may be necessary to provide an additional fastening arrangement in the form of radial set screws.

The bearing sleeves are disposed within the end portions of each of the gliders and have a preformed exact inner bore that is smooth and of very exact size to receive the cylindrical rails with a very close tolerance but free sliding fit throughout the entire length thereof. The central portion of each of the gliders intermediate the inner ends of the bearing sleeves is filled with a viscous lubricant such as commercial grease. The viscous lubricant is held within the central portion which provides a reservoir therefor.

The glider tubes and the rails are commercially available items which are of stock sizes and which come as shelf items in long sections. Such long sections are cut to size depending upon the size of a carriage which is determined by the size and weight of a motor or piece of machinery to be mounted on the support. The inner cross-sectional square shape and dimensions of the glider tubes are standard as are the external diameters of the rails and the external diameters of the bearing sleeves and the diameters of the bores therein.

Thus, it can be appreciated that a main object of the present invention is to provide an improved but yet inexpensive and easily assembled bearing arrangement made up of conventional shelf items and assembled in such a way as to function reliably between the stationary rails on the base of a motor support and the gliders on the under side of the carriage which supports the motor.

DESCRIPTION OF THE PREFERRED EMBODIMENTS

Figure 1:
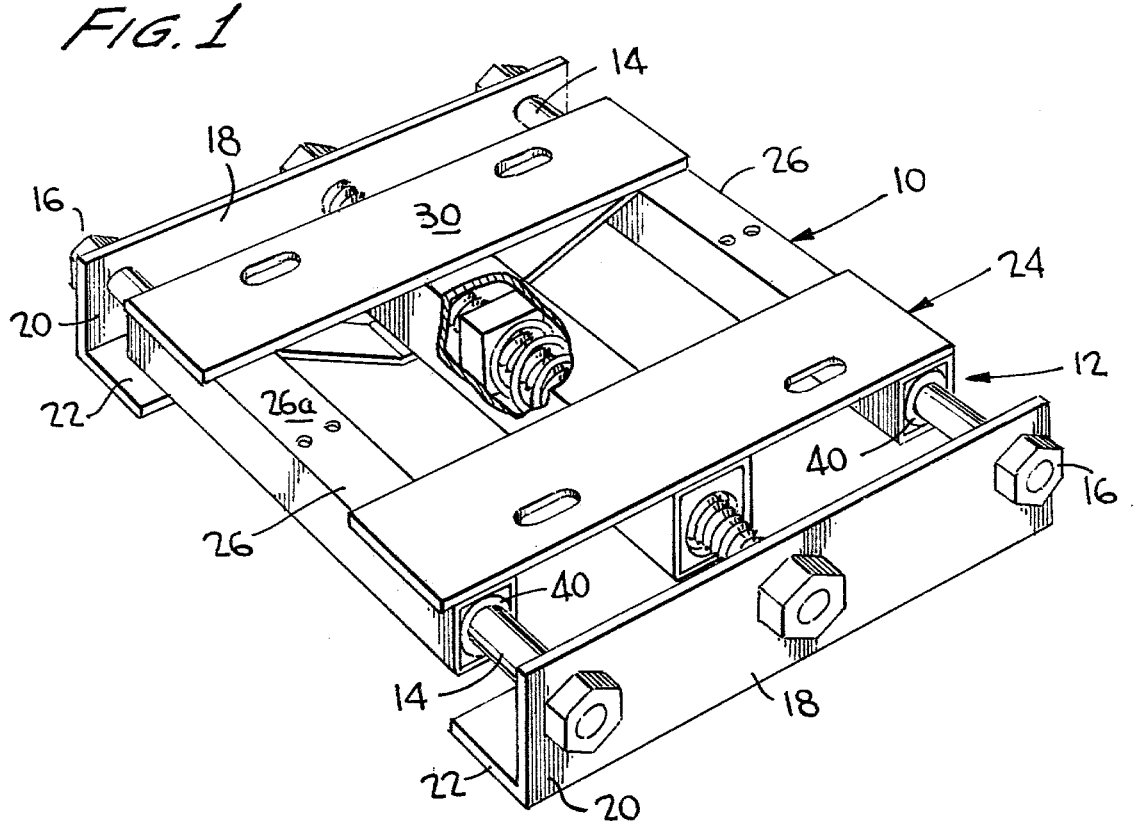
FIG. 1 is a perspective view of the motor support in general.

For clarification purposes, attention is initially directed to FIG. 1 which generally discloses a support 10 that is intended for supporting a motor or which can be used for supporting a piece of machinery driven by a belt drive by a motor or which can be used in any other machinery supporting environment. The support 10, considering it for use for supporting a motor which drives a piece of machinery through the means of a belt and pulleys fixed on the shafts of the motor and a machine, includes a base or bed 12 which is adapted to be mounted on a floor, work table or the like horizontal support in a stationary manner. The bed 12 comprises a pair of parallel cylindrical rails 14 which have their threaded end portions fastened by nuts 16 to the upstanding vertical flanges 18 of transverse cleats 20. The horizontal flanges 22 of the cleats constitute feet which rest on a floor or other horizontal supporting surface. The assembly of the rails and cleats forms a rectangle with the cleats constituting the ends and the rails constituting the sides of the rectangular assembly that forms the fixed or base portion 12 of the support 10.

The rails 14 are in the form of elongated cylindrical steel rods of precise diameter and smooth outer surfaces and are commercially available. Thus, the rails can be purchased as shelf items and, for economical manufacture, the present construction permits the rods to be purchased in lengths and then to be cut to proper lengths and the outer end portions or extremities appropriately machined for retention thereof in the flanges 18 of the cleats by having the end portions reduced and threaded so as to receive the nuts 16.

A carriage 24 constitutes the movable portion of the support 10 and is mounted for supportable sliding movement on the rails longitudinally thereof between the transverse end cleats. The carriage 24 has gliders 26 provided at its opposite sides with the gliders encompassing the rails and cooperating with the rails to not only provide means for the sliding movement of the carriage on the rails but also to provide means to support the carriage on the base or bed and to keep the carriage in proper relation and assembly upon the rails no matter in what position the support may be located.

Figure 2:
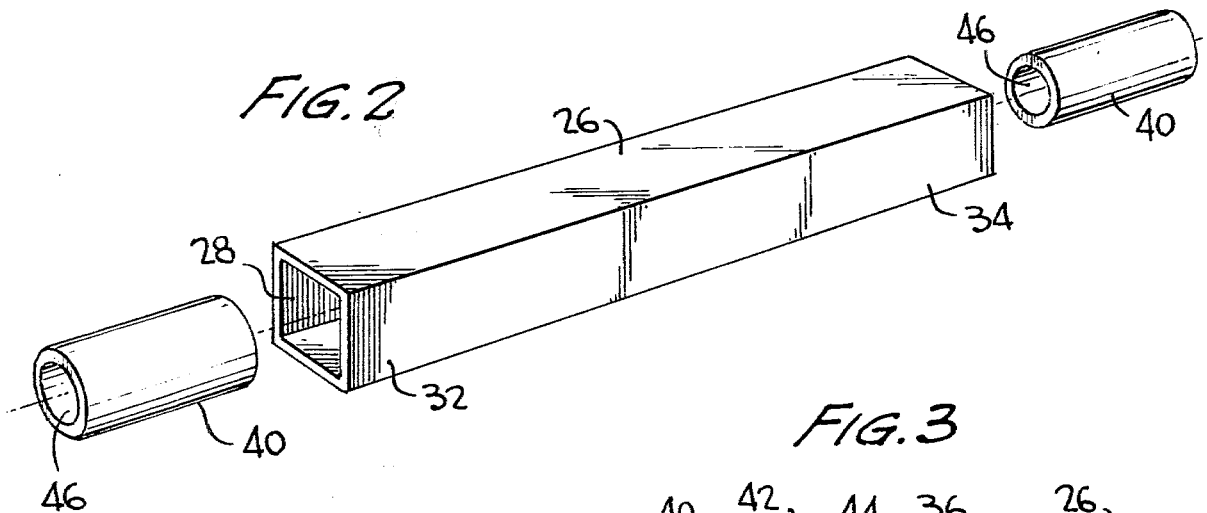
FIG. 2 is an exploded perspective view of one of the gliders and bearing sleeves therefore with the same shown in an unassembled relation.

Each glider 26 is composed of an elongated tubing of rectangular cross-section formed from stock which is readily available as shelf items. As shown in FIG. 2, each glider tube is square in cross section having an interior 28 of a slightly greater dimension than the diameter of the rails 14. The glider tubes 26 are of square cross section so that they present a flat upper surface 26a on which the supporting cross plate or plates 30, to which the feet of a motor or article of machinery (not shown) are bolted, can be fixedly superimposed by welding or the like.

Each glider tube 26 is cut in the desired length from a long piece of tubing, the severed length of the tube depending upon the size of the motor support which, of course, is dictated by the size and weight of the motor or article of machinery. Each glider has opposing open end portions 32 and 34 and a center portion 36 which defines a reservoir for a viscous lubricant such as grease 38.

Figure 3:
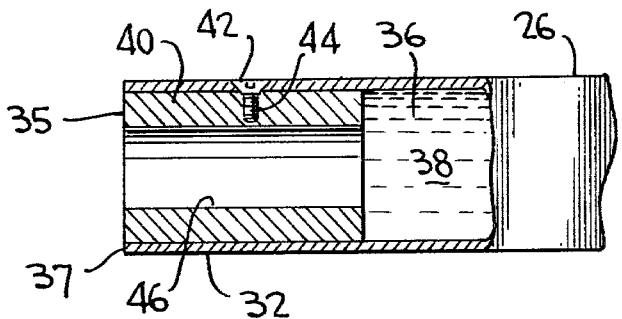
FIG. 3 is a detailed longitudinal vertical-sectional view of one end of one of the gliders with the bearing sleeve assembled in place.

Bearing sleeves 40 are press fitted in the end portions 32 and 34, as shown in FIG. 3. The bearing sleeves are cylindrical tubes with an outer diameter that snugly complements the interior cross-sectional dimensions of the end portions 32 and 34 of the gliders. The bearing sleeves are stock, shelf items that come in long elongated sections and which are cut at the assemblying place to complement the lengthwise dimensions of the end portions 32 and 34.

As shown in FIG. 3, the bearing sleeves are press fitted in the glider tube end portions with the outer ends 35 of the bearing sleeves disposed flush with the outer ends 37 of the end portions 32 and 34 of the gliders.

In the instance of metallic construction, the press fitted assembly will suffice to fix the bearing sleeves in secured place in the end portions of the glider and to securely fasten them unitarily with the glider end portions so that they are held tightly against any relative movement, either lengthwise or axial and rotational or shifting about their axes, to the end portions of the gliders. However, with plastic bearing sleeves, there may be a radial screw 42 provided to complement the pressed fit of the bearing sleeves and assist in locking the plastic sleeves in place. The use of the screw holding means is not needed with hard metal bearing sleeves in their wedged contact with the hard metal gliders. But, due to the softer nature of the plastic sleeves, the same press fit, which is achieved with metal to metal contact, may not be obtained so that the lock screw 42, which fits in a radial bore 44 in the end portions 32 and 34, is provided to engage the plastic bearing sleeves. The bore 44 is counterbored to seat the head of the lock screw.

The bearing sleeves are preformed with smooth internal axial bores 46 which are of a precise exact diameter to receive the cylindrical rails 14 in a very close but smooth sliding fit. The entire lengths of the bearing sleeves slide snugly but smoothly on the rails. With such movement and the placement of the bearing sleeves at the end portions of the gliders there is a maximum of surface supports for the motor supporting carriage 24. And any tendency of misalignment of the carriage relative to the rails or chattering will be obviated. At the same time, the thick lubricant 38 in the reservoir 36 at the center portions of the gliders will enable the gliders to be self-lubricating as the bearing sleeves slide on the rails.

For simplification of disclosure, only two rails and associated slidably encompassing gliders have been shown and described but it can be understood that depending upon the nature and size of the support 10 a larger number of complemental rails and gliders will be used. Thus, while the best known form of the invention has been described in the foregoing and illustrated in the accompanying drawing, such is merely exemplary and the invention is defined in and only limited by the appended claims.

What is claimed is:

1. A motor support comprising a plurality of cylindrical rails of similar precise diameter and having smooth outer surfaces and arranged in longitudinally extending parallel relation and in lateral spacement, cleats disposed transversely of the rails at the ends thereof and to which the ends are supportedly attached, a carriage slidably mounted on the rails and including a motor support plate on which a motor is anchored, glider tubes of external square cross-sectional shape fixed to the underside of the plate and having internal axial bores movably encompassing the rails, said glider tubes having open end portions and center portions, preformed bearing sleeves tightly press fitted in the end portions and having preformed axially extending bores of round cross-section which are of a smooth and exact diameter to snugly slidably complement the diameters of the outer surfaces of the rails with the bearing sleeves sliding freely but in close tolerance on the rails, the glider tubes at their end portions having an internal dimension of an exact size to complement the external diameters of the bearing sleeves which are press fitted therein with the end portions of the glider tubes and the bearing sleeves having flush outer ends and wherein the center portions of the glider tubes constitute lubricant reservoirs to contain viscous lubricant that permits the glider tubes to be self-lubricating as the bearing sleeves slide on the rails.

2. The motor support of claim 1 wherein said glider tubes and the bearing sleeves are formed from hard metal press fitted tightly together.

3. The motor support of claim 1 wherein the glider tubes are formed from hard metal and the bearing sleeves are formed from plastic and means in addition to the press fit is provided for rigidly securing the bearing sleeves in the end portions.

* * * * *